United States Patent [19]

Krause

[11] Patent Number: 5,512,096

[45] Date of Patent: Apr. 30, 1996

[54] FLEXIBLE GROUTING COMPOSITION

[75] Inventor: Stewart W. Krause, Billings, Mont.

[73] Assignee: Wyo-Ben, Inc., Billings, Mont.

[21] Appl. No.: 502,856

[22] Filed: Jul. 14, 1995

Related U.S. Application Data

[63] Continuation of Ser. No. 138,441, Oct. 20, 1993, abandoned.

[51] Int. Cl.$^6$ .................................................. C04B 14/10
[52] U.S. Cl. ........................... 106/718; 106/719; 106/803; 106/DIG. 4; 405/266; 405/267
[58] Field of Search ..................... 106/632, 718, 106/719, 803, DIG. 1, DIG. 4; 501/141; 405/266, 267

[56] References Cited

U.S. PATENT DOCUMENTS

| | | | |
|---|---|---|---|
| 2,861,636 | 11/1958 | Messenger | 166/29 |
| 3,028,913 | 4/1962 | Armentrout | 166/29 |
| 3,111,006 | 11/1963 | Caron | 61/36 |
| 3,986,365 | 10/1976 | Hughes . | |
| 4,378,249 | 3/1983 | Beale et al. | 106/632 |
| 4,463,808 | 8/1984 | Mason et al. | 166/292 |
| 4,886,550 | 12/1989 | Alexander | 106/74 |
| 5,021,094 | 6/1991 | Brown et al. | 106/803 |

Primary Examiner—Paul Marcantoni
Attorney, Agent, or Firm—Dickinson, Wright, Moon, Van Dusen & Freeman

[57] ABSTRACT

A grouting composition for sealing boreholes or other cavities comprising 90.0–99.99% water swellable clay and 0.01–10.0% gelling agent. The grouting composition is mixed with fresh water to provide an easily placed, low cost, low permeability sealing composition. A preferred grouting composition contains 98–99% sodium bentonite and 1–2% cement. In use 50 pounds of the preferred grouting composition is mixed with 27–38 gallons of fresh water to produce a grouting composition containing 13.7–18.2% solids and having a fluid density equal to or greater than 9.0 lbs/gallon with a Marsh funnel viscosity equal to or greater than 50 seconds.

17 Claims, No Drawings

FLEXIBLE GROUTING COMPOSITION

RELATED APPLICATION

This is a continuation of U.S. application Ser. No. 08/138,441 (filed Oct. 20, 1993), now abandoned.

FIELD OF THE INVENTION

The present invention is directed to an improved grouting composition for sealing earthen boreholes and other subsurface cavities. The grouting may be mixed and pumped using equipment commonly available on contract water well and mineral exploration well drilling rigs, is inexpensive to use and meets the plugging and abandonment requirements for bentonite fluids of the State of Nevada's "Regulations for Water Well and Related Drilling".

BACKGROUND OF THE INVENTION

Grouting compositions have been used for many years to minimize the movement of water and other fluids into, through, and out of wells and other subsurface cavities. Historically, these compositions were often comprised of neat cement, or cement-sand-gravel mixtures. These grout compositions had the disadvantage of being troublesome to place and often failed to fully fill the subsurface void. Even when up to about 5% bentonite was added to the cement mixture as a plasticizer and flow control agent complete filling of all subsurface voids remained a problem. Additionally, all of the cement mixtures tend to shrink upon curing, resulting in loss of seal integrity and increased fluid flow.

More recently various bentonite based grouting compositions have been developed which eliminate many of the problems associated with the cement based compositions. U.S. Pat. No. 2,861,636 (Messenger) describes a clay cement for use in correcting lost circulation problems in well bores which employs bentonite in combination with activated silica, activated alumina or activated silica-alumina and a water soluble phosphoric acid salt. U.S. Pat. No. 3,028,913 (Armentrout) describes a composition for use in recovering lost circulation in wells in which one embodiment consists of bentonite with a metallic chloride inhibitor and a porous inert material impregnated with a metallic hydroxide accelerator. U.S. Pat. No. 3,111,006 (Caron) describes a composition for use in soil solidification composed of clay, which may or may not include bentonite, an alkali silicate such as sodium silicate and at least one alkali phosphate salt.

U.S. Pat. No. 4,463,808 (Mason et al.) describes a composition in which bentonite, especially granular bentonite, is added to a premixed water and polymer solution which inhibits the swelling of the clay for a sufficient period of time to allow the fluid grout to be placed in a well borehole for the purpose of plugging the borehole. U.S. Pat. No. 4,886,550 (Alexander) describes a composition for cementing, sealing, plugging and grouting wells and boreholes consisting of a water swellable clay such as bentonite, an optional non-water swellable particulate filler which may be calcium bentonite, and an inorganic dispersing agent such as sodium acid pyrophosphate. U.S. Pat. No. 5,021,094 (Brown et al.) describes a composition for sealing a borehole or other subterranean cavity comprised of powdered swellable colloidal clay, such as bentonite, with a thinner, most especially a low molecular weight polyacrylate polymer, which acts to delay the onset of gelling thereby enabling higher concentrations of swelling clay to be used than would otherwise be possible.

The compositions described by Messenger, Armentrout, and Caron are complex combinations using expensive chemicals and requiring a great deal of effort and sophistication to prepare. As a result, they are too expensive to be used in general water well and mineral exploration borehole plugging and abandonment. The composition described by Mason, et al suffers from the fact that it has a strong tendency to hydrate prematurely, before it can be properly placed, and thereby frequently causes plugging of mixers, pumps and conveying hoses and pipes. The compositions described by Alexander and Brown, et al., require that significant concentrations of the compositions be used in the prepared grout, normally about 30% by total weight of the prepared grout, in order to yield a grout mixture which will properly gel or set up within a borehole. The high composition usage rate required by these inventions makes them prohibitively expensive for many types of plugging and abandonment work due to the large volumes of grout slurry typically required by these applications. The composition of the present invention improves on or solves each of the deficiencies described for the aforementioned prior art compositions.

SUMMARY OF THE INVENTION

The present invention is directed toward an easily prepared, inexpensive, one part, water mixable grout composition which exhibits low permeability to water and other ground fluids and which is easily mixed, pumped and placed using equipment normally found on mobile water well and mineral exploration well drilling rigs. A composition of the invention contains 90.0–99.99% of a water swellable colloidal clay, such as bentonite, and 0.01–10.0% gelling agent. When the composition of the invention is mixed with water, the gelling agent dissolves causing the grout to achieve a much more substantially gelled and thickened structure than could be obtained with the same concentration of bentonite alone.

A grout mixture is prepared by adding 50 lbs. of the dry grout composition to 27–38 gallons of water to provide a grout mixture having about 13.7–18.2% solids with a density of about 9.0–9.3 lbs/gal. and a Marsh funnel viscosity of from greater than 1800 seconds to about 160 seconds. Preferably a grout mixture is prepared by adding 50 lbs. of the dry grout composition to 30–33 gallons of water to provide a grout mixture having about 15.4–16.7% solids with a density of about 9.1–9.2 lbs./gal and a Marsh funnel viscosity of from greater than 1800 seconds to about 160 seconds. When used in these concentrations the composition of this invention is economical to use and meets all requirements of the Nevada Department of Conservation and Natural Resources, Division of Water Resources' Regulations for Water Well and Related Drilling for bentonite plugging fluids.

While the present invention has many uses, it is particularly useful in grouting, cementing and plugging water wells, mineral exploration wells, monitoring wells, seismic shot holes and other boreholes, especially during abandonment procedures and in order to economically prevent fluid movement within the borehole and to stabilize the well. The composition of the invention is also useful in water proofing foundations or other subsurface earthen structures where it may be necessary to limit fluid movement or contact with the structure.

DETAILED DESCRIPTION OF THE INVENTION

A composition of the present invention is useful for grouting well bores or other subsurface cavities during plugging and abandonment to fully seal the entire borehole and to prevent the movement of surface or groundwater or other fluids into, through or along the borehole. The composition may also be used for grouting well casings where the annular space between the casing and the borehole wall must be sealed; for grouting monitoring wells where sections of the borehole must be sealed; and for grouting, pressure grouting, and sealing subgrade structures such as foundations in order to limit their contact with, and permeability to, ground water and other fluids. Further, the present invention may be used in any subgrade application where it is desirable or necessary to limit the movement of groundwater or other fluids.

A composition of the present invention may also be used as a flexible, low permeability backfilling and plugging material for use in cementing conduit and cables in subsurface trenches or boreholes, for plugging and sealing around cables within conduit or pipe, and as an electrically transmissive medium for backfilling around electrical grounding devices.

The water swellable clays useful in the composition of the present invention include any colloidal clay minerals which will swell upon hydration with water. The water swellable clays useful in the composition of the present invention will also be those which will disperse upon hydration with water to form thixotropic slurries. Slurries of this type will form gels when left in a quiescent environment, will pass into a fully liquid phase when mechanically agitated, and will reform gels when the agitation ceases with the process and affect being repeatable through an infinite number of cycles without any diminishment of the capability to reform a gelled structure. The colloidal clay may be any member of the dioctrahedral or trioctahedral smectite group, or mixtures thereof, including bentonite (montmorillonite), beidellite, nontronite, hectorite and saponite. Additionally, the clay may also be attapulgite or sepiolite or a mixture of these two clay minerals, or a mixture of these two clay minerals with one or more minerals from the smectite group.

In the preferred embodiment of the present invention the water swellable colloidal clay is sodium bentonite. Bentonites are known to exhibit a wide range of characteristics which may be used to define quality for various end uses. The characteristics which have been found to be most useful in defining quality in the sodium bentonite to be used in the present invention are those of viscosifying and gelling capability in aqueous suspension. It is widely known that these and other characteristics of sodium bentonite are controlled by the quality of the crystalline structure of the mineral and the type and amount of exchangeable cations in association with it, both of which can vary significantly between bentonite deposits in different areas or even within a single deposit.

Any sodium bentonite may be used in the present invention; however, those sodium bentonites which produce apparent viscosities of about 7 centipoise or greater for a 6% (wt:wt) aqueous suspension, as measured on a FANN Model 35A viscometer, are often difficult to work with because they rapidly and prematurely form very stiff gels which are difficult to mix and pump. This problem may be overcome, however, by further diluting the solids concentration in the grout mixture by adding additional water, or through the addition of small amounts of a thinner, such as any of several phosphates, tannins, lignite, lignosulfonates or low molecular weight polyacrylate polymers. When properly employed, these materials function to temporarily delay the onset of gelling of the mixture for a sufficient period of time to allow mixing, pumping and placement to be completed without difficulty. Additionally, those sodium bentonites which produce apparent viscosities of about 4 centipoise, or less, for a 6% (wt:wt) aqueous suspension, as measured on a FANN Model 35A viscometer, often fail to yield gels with sufficient strength to enable the grout, when finally placed, to properly set up. This problem can be overcome, however, by increasing the concentration of solids in the grouting mixture.

Research has shown that the optimum viscosity characteristics for sodium bentonite in the preferred embodiment of the present invention are an apparent viscosity of about 4–7 centipoise for a 6% (wt:wt) aqueous suspension as measured on a FANN Model 35A viscometer. Sodium bentonites having this characteristic enable grout mixtures to be prepared having from about 13.7–18.2% solids which do not gel prematurely while ultimately forming very stiff gels after placement.

A preferred grout composition of the invention consists of water swellable clay, such as bentonite, in an amount of 90.0–99.9% by weight and cement in an amount of 0.1%–10.0% by weight. This composition is added to 27 to 38 gallons of fresh water to provide a grout mixture having about 14.7–17.7% solids.

In the preferred embodiment of the present invention the colloidal clay is sodium bentonite (sodium montmorillonite) which is finely ground so that approximately 80%, by weight, will pass through a 200 mesh U.S. standard sieve. The fine grind of the colloidal clay aids in its rapid mixing with and dispersion in water. A finely ground colloidal clay is also preferred in order to limit the problems encountered when coarser granular colloidal clays are used, wherein the large clay particles become sticky upon hydration and, being unable to rapidly disperse in the mixing water due to their large size, may aggregate, by particle to particle adhesion, and cause plugging of the pumping equipment and the conveying and placement pipes, tubes and hoses. The problem of particle to particle adhesion observed in a water and clay mixture when granular bentonite is used, is overcome by the use of finely ground colloidal clay because clumps of finely ground clay particles, formed by particle to particle adhesion, are easily broken up and do not clog pumping and conveying equipment.

Notwithstanding the use of finely ground clay in the preferred embodiment of the invention, granular clay may also be used with equal success provided that it is thoroughly mixed with the water prior to placement until the clay is substantially dispersed and few coarse particles remain in the mix. As a result, a composition of the invention may be placed within the ground cavity by pumping, immediately after adding the finely ground dry clay to the mix water, while the mix is still very lumpy and before substantial mixing and dispersion of the clay solids in the mix water has occurred.

The amount of mixing and the degree of dispersion of the clay solids in the mix water does not affect the in-place sealing characteristics which are ultimately achieved with the composition in any way. However, where a grout mixture prepared from the composition of this invention is to be placed in a borehole which penetrates highly porous or fractured strata, the use of lumpy, incompletely dispersed mixtures may be inappropriate. Incompletely dispersed grout mixtures typically have low viscosity and gelling characteristics and may flow out of the borehole and into the porous strata. Alternatively, the grout mixture may be mixed until the clay solids are fully dispersed in the mix water prior to placement in the borehole. This will yield a thick paste-like consistency which exhibits very high viscosity and gelling characteristics and which will remain substantially in place in a borehole which passes through porous or fractured strata.

When dispersed in an aqueous solution, water swellable colloidal clay crystals become oriented in positions of minimum free energy. Most commonly this results in positively charged crystal edges being oriented toward the negatively charged crystal surfaces of adjacent clay crystals. In the absence of agitation, this orientation results in the formation of gels in the clay suspension. Both the rate of gel formation and the ultimate viscosity of the gel are dependent upon the concentration and type of electrolytes present in the suspending water and the concentration of clay. Higher concentrations of electrolyte and/or clay yield more rapidly forming and higher viscosity gels.

In the composition of the present invention the gelling agent is used to alter both the concentration and type of electrolyte present in the system. In a preferred embodiment of the present invention cement is used as the gelling agent. Cement is composed of a variety of slightly to moderately water soluble calcium compounds with small amounts of magnesium, sodium and potassium compounds of varying water solubility. The relatively slow rate of solution of the cement compounds allows the bentonite in the composition to become substantially dispersed in, and hydrated by, the mixing water before its properties are altered by the non-sodium cations dissolved from the cement. As the concentration of soluble non-sodium cations in the grout increases the sodium ions present on the montmorillonite crystals are replaced, principally by calcium ions. This alters the electrochemical balance on the clay crystal surfaces sufficiently to enable individual clay crystals to begin to associate into loose groups called flocs. This process, known as flocculation, ultimately causes a substantial increase in the viscosity and gelling strength of the mixture. In addition, a filler may be added to increase the density of the composition, said filler may comprise at least one member selected from the group consisting of barite, iron oxide, sand and crushed stone.

In contrast to the art taught by Alexander (U.S. Pat. No. 4,886,550) and Brown, et al (U.S. Pat. No. 5,021,094), where various thinners and dispersants are used to reduce initial mixture viscosity and delay the onset of gel formation so that a higher concentration of bentonite solids can be added to a grout mixture than would otherwise be possible, the purpose of the present invention is to produce a grout mixture having a relatively low bentonite solids concentration of from 13.7–18.2% which, nevertheless, is able to ultimately produce high viscosity and gel strength characteristics after the mixture has been placed in a borehole or other underground cavity.

A gelling agent is therefore employed as a component of the present invention. In its preferred embodiment the gelling agent is cement. Any of the many commercially available types of cement such as Portland Type I & II, III, IV, V or others may be employed. However, in a more preferred embodiment of the invention Portland Type I & II cement is used because it is typically the least expensive and most readily available of the various cement types. The gelling agent may be selected from the group consisting of Portland cement type I, Portland cement type II, and mixtures thereof.

The use of cement as a gelling agent in the preferred embodiment of the invention is only one embodiment of the invention and does not preclude the use of other gelling agents. Such gelling agents include the oxides, hydroxides, sulfates, chlorides and carbonates of calcium and magnesium, aluminum sulfate, iron sulfate, iron chloride, pozzolanic fly ash, and polyacrylamide and polyacrylate polymer and poly acrylamide-poly acrylate copolymer flocculants, where the usage rate of these materials is between 0.01–10.0% of the dry grout composition. Additional embodiments of the present invention also include mixtures of two or more of these gelling agents.

An exemplary grout composition may be prepared by mixing 99.0% untreated sodium bentonite clay, having an apparent viscosity of between about 4 and 7 centipoise for a 6% (wt:wt) aqueous suspension as measured using a FANN Model 35A viscometer and a moisture content of about 8%, and which has been finely ground such that 80% passes a 200 mesh U.S. Standard Sieve, with 1.0% Portland Type I & II cement. The dry grout composition thus prepared has the following typical chemical analysis:

| | |
|---|---|
| $SiO_2$ | 61.47% |
| $Al_2O_3$ | 19.42% |
| $Fe_2O_3$ | 3.93% |
| $Na_2O$ | 3.04% |
| Mgo | 1.72% |
| CaO | 1.14% |
| $K_2O$ | 0.73% |
| $TiO_2$ | 0.22% |
| Other | 0.33% |
| Water | 8.00% |

Fifty (50.0) pounds of this premixed dry composition is then added to 30 gallons of fresh water to make up a grout mixture which contains about 16.7% solids. The percentage of materials in the grout slurry thus prepared, as a percent by weight of the entire grout composition, is approximately 83.3% water, 16.53% sodium bentonite and 0.17% cement.

The grout composition thus prepared may be placed either immediately after the dry solids are added to the water while the mixture is still very lumpy or, in the preferred embodiment of the method for placement, after mixing until the mixture is of a smooth consistency. This composition remains pumpable indefinitely as long as it is continuously agitated in the mixer. When fully mixed a mixture of the composition will remain pumpable for 12 hours or longer. However, after agitation ceases in the mixing chamber the mixture will gel up within about 5 minutes and be non-flowing. This will limit the pumping capabilities of the mixture due to the inability to move the mixture from the mixing chamber into the pump. This limitation may be overcome by resuming agitation in the mixing chamber so that the gel structure of the mixture is broken and it is temporarily returned to a fluid state. The composition may be effectively pumped to any depth in any hole or cavity of sufficient size to allow passage of the grout conveying tube or pipe. When emplaced, the composition will form a plastic seal exhibiting a water permeability of $1\times10^{-8}$ cm/sec., or less.

It should be understood that variations and modifications may be made without departing from the spirit, scope or intent of the invention. The foregoing embodiments are, therefore, considered to be illustrative and not restrictive of the invention.

What is claimed is:

1. A grouting composition useful for effecting a seal in an earthen borehole or other subsurface cavity, wherein said grouting composition consists by weight essentially of 90.0–99.99% water swellable clay and 0.01–10.0% gelling agent, and wherein said water swellable clay is sufficiently ground so that at least about 80% passes a 200 mesh U.S. standard sieve.

2. The composition of claim 1 wherein said water swellable clay comprises at least one member selected from the group consisting of beidellite, nontronite, hectorite, saponite, attapulgite, sepiolite and bentonite.

3. The composition of claim 1 wherein said water swellable clay comprises sodium bentonite.

4. The composition of claim 3 wherein said sodium bentonite has an apparent viscosity of from about 4 to 7 centipoise for a suspension of 6 parts bentonite per 100 parts water.

5. The composition of claim 1 wherein said gelling agent comprises at least one member selected from the group consisting of: aluminum sulfate, iron sulfate, iron chloride, pozzolanic fly ash, cement, polyacrylamide flocculents, polyacrylate flocculents, and the oxides, hydroxides, sulfates, carbonates and chlorides of calcium and magnesium.

6. The composition of claim 1 wherein said gelling agent is selected from the group consisting of Portland cement type I, Portland cement Type II, and mixtures thereof.

7. A composition of claim 1 wherein a filler is added to increase the density of the composition, said filler comprising at least one member selected from the group consisting of barite, iron oxide, sand and crushed stone.

8. A grouting mixture comprising water and a grouting composition, wherein said grouting composition comprises about 13.7–18.2% by weight of solids and consists essentially of, by weight, 90.0–99.99% water swellable clay and 0.01–10.0% gelling agent, and wherein the ratio of grouting composition to water is within the range of about 50 lbs. of grouting composition per 27 gal. of water to 50 lbs. grouting composition per 38 gal. of water.

9. The grouting mixture of claim 8, wherein said grouting composition is premixed.

10. The grouting mixture of claim 8 wherein said water swellable clay comprises at least one member selected from the group consisting of beidellite, nontronite, hectorite, saponite, attapulgite, sepiolite and bentonite.

11. The grouting mixture of claim 8 wherein said water swellable clay comprises sodium bentonite.

12. The composition of claim 11 wherein said sodium bentonite has an apparent viscosity of from about 4 to 7 centipoise for a suspension of 6 parts bentonite per 100 parts water when tested using a Fann Model 35A viscometer.

13. The grouting mixture of claim 8 wherein said water swellable clay is sufficiently finely ground so that at least about 80% passes a 200 mesh U.S. standard sieve.

14. The grouting mixture of claim 8 wherein said gelling agent comprises at least one member selected from the group consisting of aluminum sulfate, iron sulfate, iron chloride, pozzolanic fly ash, cement, polyacrylamide flocculents, polyacrylate flocculents, and the oxides, hydroxides, sulfates, carbonates and chlorides of calcium and magnesium.

15. The grouting mixture of claim 14 wherein said gelling agent is selected from the group consisting of Portland cement type I, Portland cement Type II, and mixtures thereof.

16. The grouting mixture of claim 8 wherein a filler is added to increase the density of the composition, said filler comprising at least one member selected from the group consisting of barite, iron oxide, sand and crushed stone.

17. A grouting composition useful for effecting a seal in an earthen borehole or other subsurface cavity, wherein said grouting composition consists by weight essentially of 90.0–99.99% sodium bentonite and 0.01–10.0% gelling agent, and wherein said sodium bentonite has an apparent viscosity of from about 4 to 7 centipoise for a suspension of 6 parts bentonite per 100 parts water.

* * * * *